(12) United States Patent
Na et al.

(10) Patent No.: US 10,840,564 B2
(45) Date of Patent: Nov. 17, 2020

(54) BATTERY PROTECTION CIRCUIT MODULE AND BATTERY PACK COMPRISING SAME

(71) Applicant: ITM SEMICONDUCTOR CO., LTD., Chungchongbuk-do (KR)

(72) Inventors: Hyuk Hwi Na, Chungcheongbuk-do (KR); Ho Seok Hwang, Gyeonggi-do (KR); Young Seok Kim, Chungcheongbuk-do (KR); Sang Hoon Ahn, Chungcheongbuk-do (KR)

(73) Assignee: ITM SEMICONDUCTOR CO., LTD., Chungcheongbuk-Do (KR)

( * ) Notice: Subject to any disclaimer, the term of this patent is extended or adjusted under 35 U.S.C. 154(b) by 364 days.

(21) Appl. No.: 15/749,670

(22) PCT Filed: Aug. 11, 2016

(86) PCT No.: PCT/KR2016/008823
§ 371 (c)(1),
(2) Date: Feb. 1, 2018

(87) PCT Pub. No.: WO2017/030320
PCT Pub. Date: Feb. 23, 2017

(65) Prior Publication Data
US 2018/0233785 A1 Aug. 16, 2018

(30) Foreign Application Priority Data

Aug. 20, 2015 (KR) .................. 10-2015-0117415

(51) Int. Cl.
*H01M 10/42* (2006.01)
*H02J 7/00* (2006.01)
(Continued)

(52) U.S. Cl.
CPC ..... *H01M 10/4257* (2013.01); *H01M 10/425* (2013.01); *H01M 10/48* (2013.01);
(Continued)

(58) Field of Classification Search
CPC .................................. H01M 10/4257
(Continued)

(56) References Cited

U.S. PATENT DOCUMENTS 5,847,538 A * 12/1998 Yoshimatsu ............ H01M 6/50
320/123
6,577,105 B1 * 6/2003 Iwaizono .............. H02J 7/0029
320/134

(Continued)

FOREIGN PATENT DOCUMENTS

CN 203883525 10/2014
KR 1020050057693 A 6/2006
(Continued)

*Primary Examiner* — Jerry D Robbins
(74) *Attorney, Agent, or Firm* — Stuart H. Mayer; Mayer & Williams PC

(57) ABSTRACT

According to an aspect of the present invention, there is provided a battery protection circuit module including a first positive terminal and a first negative terminal electrically connected to electrode terminals of a battery bare cell, a second positive terminal and a second negative terminal electrically connected to a charger or an electronic device, a first protection circuit unit including a first single field-effect transistor connected between at least one of the first positive and negative terminals and at least one of the second positive and negative terminals, and a first protection integrated circuit (P-IC) for controlling the first single field-effect transistor, and a second protection circuit unit including a second single field-effect transistor connected between at least one of the first positive and negative terminals and at least one of the second positive and negative terminals, and a second P-IC for controlling the second single field-effect transistor.

15 Claims, 20 Drawing Sheets

(51) Int. Cl.
  *H02H 7/18* (2006.01)
  *H01M 10/48* (2006.01)
(52) U.S. Cl.
  CPC ................ *H02H 7/18* (2013.01); *H02J 7/00* (2013.01); *H02J 7/0029* (2013.01); *H02J 7/0031* (2013.01); *H02J 7/0042* (2013.01); *H01M 2220/30* (2013.01); *H02J 7/00302* (2020.01); *H02J 7/00304* (2020.01); *H02J 7/00306* (2020.01)
(58) Field of Classification Search
  USPC ........................................................ 320/134
  See application file for complete search history.

(56) References Cited

U.S. PATENT DOCUMENTS

| | | | | |
|---|---|---|---|---|
| 2003/0122525 | A1* | 7/2003 | Stellberger | H02J 7/0026 320/134 |
| 2005/0231168 | A1* | 10/2005 | Lin | H02J 7/0031 320/134 |
| 2007/0145944 | A1* | 6/2007 | Poff | H02J 7/0031 320/112 |
| 2007/0291429 | A1* | 12/2007 | Kawachi | H01L 27/0266 361/56 |
| 2008/0224664 | A1* | 9/2008 | Sano | H02J 7/0031 320/134 |
| 2009/0121683 | A1* | 5/2009 | Goto | H02J 7/0031 320/134 |
| 2011/0074356 | A1* | 3/2011 | Yamazaki | H02J 2207/20 320/134 |
| 2013/0002204 | A1* | 1/2013 | Oshima | H03K 19/01852 320/134 |
| 2017/0302064 | A1* | 10/2017 | Binder | H02H 5/04 |

FOREIGN PATENT DOCUMENTS

| | | | |
|---|---|---|---|
| KR | 1020060059679 A | | 6/2006 |
| KR | 1020050057693 A | | 8/2006 |
| KR | 1020080019447 | * | 3/2008 |
| KR | 1020080019447 A | | 3/2008 |
| KR | 1020140124735 A | | 10/2014 |
| KR | 1020160109532 A | | 9/2016 |

* cited by examiner

BATTERY PROTECTION CIRCUIT MODULE AND BATTERY PACK COMPRISING SAME

TECHNICAL FIELD

The present invention relates to a battery for an electronic device and, more particularly, to a battery protection circuit module for protecting a battery cell, and a battery pack including the battery protection circuit module.

BACKGROUND ART

Batteries are generally used in electronic devices such as mobile phones and personal digital assistants (PDAs). As a battery most commonly used in mobile devices, etc., a lithium ion battery is heated when overcharge or overcurrent occurs, and even has the risk of explosion as well as performance degradation if heating is continued and temperature thereof is increased. Accordingly, the battery should include a battery protection circuit device for interrupting battery operation to prevent the performance degradation.

RELATED ART DOCUMENT

1. Korean Application Publication 10-2007-0044544 published on Apr. 30, 2007
2. Korean Patent Publication 10-0791551 registered on Dec. 27, 2007

DETAILED DESCRIPTION OF THE INVENTION

Technical Problem

Typical battery protection circuit devices use two field-effect transistors as switches to control charging and discharging. However, performance degradation may occur due to an increase in operation resistance and volume reduction may not be easily achieved.

The present invention provides a battery protection circuit module and a battery pack using a single field-effect transistor. However, the scope of the present invention is not limited thereto.

Technical Solution

According to an aspect of the present invention, there is provided a battery protection circuit module including a first positive terminal and a first negative terminal electrically connected to electrode terminals of a battery bare cell, a second positive terminal and a second negative terminal electrically connected to a charger or an electronic device, a first protection circuit unit including a first single field-effect transistor connected between at least one of the first positive and negative terminals and at least one of the second positive and negative terminals, and a first protection integrated circuit (P-IC) for controlling the first single field-effect transistor, and a second protection circuit unit including a second single field-effect transistor connected between at least one of the first positive and negative terminals and at least one of the second positive and negative terminals, and a second P-IC for controlling the second single field-effect transistor.

In the battery protection circuit module, at least one of the second and first protection circuit units may operate for overcurrent protection to replace a positive temperature coefficient (PTC) thermistor.

In the battery protection circuit module, the second single field-effect transistor and/or the first single field-effect transistor may include a drain terminal, a source terminal, a gate terminal, and a well terminal, the source terminal of the second single field-effect transistor may be electrically connected to the first negative terminal, the drain terminal of the first single field-effect transistor may be electrically connected to the second negative terminal, the drain terminal of the second single field-effect transistor and the source terminal of the first single field-effect transistor may be electrically connected to each other, the P-IC may control charging/discharging of the battery bare cell by controlling the gate terminal electrically connected to the P-IC, controlling whether to switch on the single field-effect transistor, and controlling a bias voltage of the well terminal by using an internal switch, the P-IC may include a reference terminal, a detection terminal, the P-IC may include a reference terminal, a detection terminal, and a bias terminal connected to the well terminal, the bias terminal may be always connected to one of the reference terminal and the detection terminal, and the internal switch may be connected between the bias terminal and the other of the reference terminal and the detection terminal, which is not always connected to the bias terminal.

In the battery protection circuit module, the P-IC may include a diode connected between the bias terminal and the one of the reference terminal and the detection terminal, which is connected to the bias terminal, to have a forward direction corresponding to a direction toward the bias terminal.

In the battery protection circuit module, the bias terminal may be always connected via the diode to the reference terminal, and the internal switch may be interposed between the bias terminal and the detection terminal. The internal switch may be turned on when overcharge is detected.

In the battery protection circuit module, the bias terminal may be always connected via the diode to the detection terminal, and the internal switch may be interposed between the bias terminal and the reference terminal. The internal switch may be turned on when overdischarge is detected.

In the battery protection circuit module, the first protection circuit unit and/or the second protection circuit unit may further include at least one passive element connected to the P-IC.

In the battery protection circuit module, the first and second protection circuit units may have equal configurations of elements.

In the battery protection circuit module, the first single field-effect transistor and/or the second single field-effect transistor may include a drain terminal, a source terminal, a gate terminal, and a well terminal, the P-IC may control charging/discharging of the battery bare cell by controlling the gate terminal electrically connected to the P-IC, controlling whether to switch on the single field-effect transistor, and controlling a bias voltage of the well terminal by using an internal switch, the P-IC may include a reference terminal connected between the first negative terminal and the drain terminal, a detection terminal connected between the second negative terminal and the source terminal, and a bias terminal connected to the well terminal, and the bias terminal may be connectable via the internal switch to the detection terminal.

According to another aspect of the present invention, there is provided a battery protection circuit package including a substrate, and the above-described battery protection circuit module mounted on the substrate.

According to another aspect of the present invention, there is provided a battery pack including a battery bare cell, and the above-described battery protection circuit package connected to the battery bare cell.

According to the afore-described embodiments of the present invention, a battery protection circuit module capable of achieving performance improvement by reducing operation resistance and of achieving a compact size, and a battery protection circuit package and a battery pack including the battery protection circuit module. However, the scope of the present invention is not limited to the above-described effects.

MODE OF THE INVENTION

Figure 1:
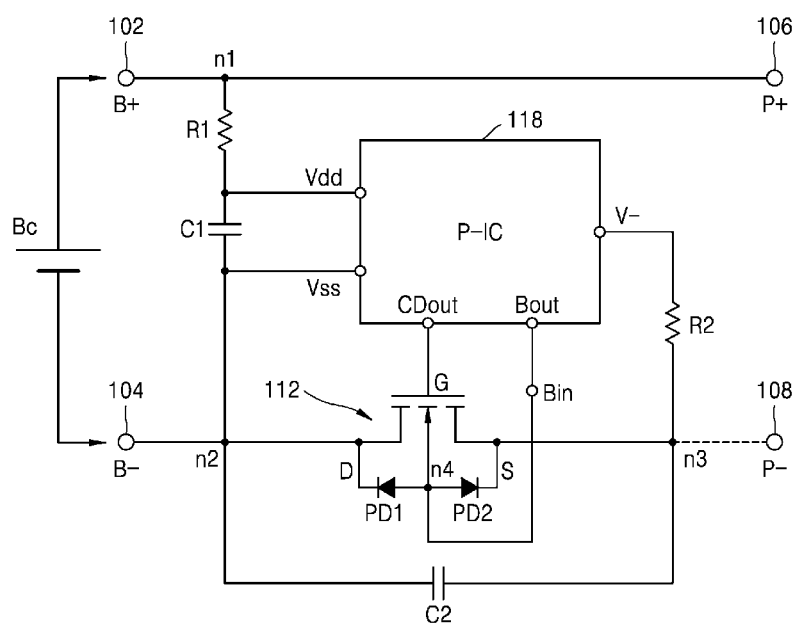
FIG. 1 is a circuit diagram showing an example of a part of a battery protection circuit module according to embodiments of the present invention.

Hereinafter, the present invention will be described in detail by explaining embodiments of the invention with reference to the attached drawings.

The invention may, however, be embodied in many different forms and should not be construed as being limited to the embodiments set forth herein; rather, these embodiments are provided so that this disclosure will be thorough and complete, and will fully convey the concept of the invention to one of ordinary skill in the art. In the drawings, the thicknesses or sizes of layers are exaggerated for clarity.

In the following description, like reference numerals may denote like circuits in terms of a battery protection circuit but may denote like elements or circuit parts in terms of a battery protection circuit package.

An integrated circuit (IC) may refer to an electronic part in which a large number of elements are integrated into a chip to perform a certain complex function.

FIG. 1 is a circuit diagram showing an example of a part of a battery protection circuit module according to embodiments of the present invention.

Referring to FIG. 1, the battery protection circuit module according to the current embodiment may include a first positive terminal 102 and a first negative terminal 104 electrically connected to electrode terminals of a battery bare cell Bc, and a second positive terminal 106 and a second negative terminal 108 electrically connected to a charger or an electronic device. For example, the first positive terminal 102 may be an internal positive terminal B+ connected to a positive electrode of the battery bare cell Bc inside a battery pack, the first negative terminal 104 may be an internal negative terminal B- connected to a negative electrode of the battery bare cell Bc, the second positive terminal 106 may be an external positive terminal P+ connected to a positive electrode of the charger or the electronic device outside the battery pack, and the second negative terminal 108 may be an external negative terminal P- connected to a negative electrode of the charger or the electronic device.

Although not shown in FIG. 1, the battery protection circuit module according to some embodiments of the present invention may further include additional external connection terminals.

The battery protection circuit module may include a single field-effect transistor 112 connected between at least one of the first positive and negative terminals 102 and 104 and at least one of the second positive and negative terminals 106 and 108, and a protection integrated circuit (P-IC) 118 for controlling the single field-effect transistor 112.

For example, the single field-effect transistor 112 may include a drain terminal D, a source terminal S, a gate terminal G, and a well terminal Bin, and may be connected between the first and second negative terminals 104 and 108. For example, the drain terminal D may be electrically connected to the first negative terminal 104, and the source terminal S may be electrically connected to the second negative terminal 108. However, the drain and source terminals D and S are not fixed in the single field-effect transistor 112 and thus the names thereof may be switched.

The P-IC 118 for controlling the single field-effect transistor 112 may configure a protection circuit unit. The protection circuit unit may interrupt charging/discharging or operation of the battery bare cell Bc by detecting overdischarge, overcharge, and/or overcurrent of a battery. Specifically, the P-IC 118 may control the single field-effect transistor 112 to control overcharge and/or overdischarge of the battery bare cell Bc.

The single field-effect transistor 112 may be, for example, an N-type metal-oxide semiconductor field-effect transistor (NMOSFET). The single field-effect transistor 112 may include a pair of parasitic diodes PD1 and PD2 connected in opposite directions from a node n4 connected to the well terminal Bin. For example, the parasitic diode PD1 may be connected to have a forward direction corresponding to a direction from the node n4 toward the drain electrode D, and the parasitic diode PD2 may be connected to have a forward direction corresponding to a direction from the node n4 toward the source electrode S.

The P-IC 118 may include a control logic for controlling the single field-effect transistor 112. For example, the control logic may include a reference voltage setter, a comparer for comparing a reference voltage to a charging/discharging voltage, an overcurrent detector, and a charging/discharging detector.

Criteria for determining charging and discharging states may be changed in accordance with specifications required by a user, and the charging and discharging states are determined based on the criteria by detecting a voltage difference between terminals of the P-IC 118. For example, to output the control logic, the P-IC 118 may include a reference terminal Vss, a voltage source terminal Vdd, a detection terminal V−, a charging/discharging control signal output terminal CDout, and a bias terminal Bout.

The P-IC 118 may be connected via at least one passive element to nodes n1, n2 and n3. For example, the voltage source terminal Vdd may be connected via a resistor R1 to the node n1 between the first and second positive terminals 102 and 106, and the reference terminal Vss may be connected to the node n2 between the first negative terminal 104 and the drain terminal D. A capacitor C1 for preventing a short circuit between the two nodes n1 and n3 may be interposed between the reference terminal Vss and the voltage source terminal Vdd between the nodes n1 and n2. The detection terminal V− may be connected via a resistor R2 to the node n3. A capacitor C2 may be connected between the two nodes n2 and n3 in parallel with the single field-effect transistor 112.

Based on the above-described configuration, the P-IC 118 may apply a charging voltage or a discharging voltage through the voltage source terminal Vdd on the basis of a voltage of the reference terminal Vss, and detect charging/discharging and overcurrent states through the detection terminal V−. The charging/discharging control signal output terminal CDout may be connected to the gate terminal G of the single field-effect transistor 112 to control an on-off state of the single field-effect transistor 112 when the battery is charged and/or discharged.

When the battery is charged, a charging current flows from the second positive terminal 106 toward the first positive terminal 102, and from the first negative terminal 104 toward the second negative terminal 108. When the battery is discharged, a discharging current flows from the first positive terminal 102 toward the second positive terminal 106, and from the second negative terminal 108 toward the first negative terminal 104.

The P-IC 118 may operate to turn off the single field-effect transistor 112 by outputting a LOW signal through the charging/discharging control signal output terminal CDout when overcurrent or an overdischarge state is detected during battery discharging, or to turn off the single field-effect transistor 112 by outputting a LOW signal through the charging/discharging control signal output terminal CDout when overcurrent or an overcharge state is detected during battery charging. As such, a circuit between the first and second negative terminals 104 and 108 may be interrupted to protect the battery from overcharge, overdischarge, and/or overcurrent.

In addition, the P-IC 118 may control electric field states of the parasitic diodes PD1 and PD2 by applying a voltage to the well terminal Bin of the single field-effect transistor 112 through the bias terminal Bout other than the charging/discharging control signal output terminal CDout.

The resistor R1 and the capacitor C1 serve to stabilize fluctuations in a supply voltage of the P-IC 118. When the resistor R1 has a high resistance value, since a high voltage is detected due to a current penetrating into the P-IC 118, a resistance value of the resistor R1 may be set to a value equal to or less than a predetermined value, e.g., 1 KΩ. In addition, for stable operation, a capacitance value of the capacitor C1 may be appropriately adjusted and may have an appropriate value equal to or greater than, for example, 0.01 μF.

The resistors R1 and R2 serve as a current limiter when a charger provides a high voltage exceeding an absolute maximum rating of the P-IC 118 or when the charger is connected with wrong polarity. Since the resistors R1 and R2 are closely related to power consumption, normally, a sum of resistance values of the resistors R1 and R2 may be set to be greater than 1 KO. Since resumption may not occur after overcharge protection if the resistance value of the resistor R2 is excessively high, the resistance value of the resistor R2 may be set to a value equal to or less than 10 KO.

The capacitor C1 does not exert a strong influence on characteristics of battery protection circuit products, but is added upon user requests or for stability. The capacitor C1 is used to achieve system stabilization by increasing a tolerance to voltage fluctuations or external noise.

Optionally, although not shown in FIG. 1, a structure in which a resistor and a varistor are connected in parallel to each other may be added for electrostatic discharge (ESD) and surge protection. The varistor is an element capable of reducing a resistance thereof when overvoltage occurs, and may minimize circuit damage or the like due to overvoltage. In the above-described protection circuit unit, the number or configuration of passive elements may be appropriately changed in accordance with added functions.

According to the above-described battery protection circuit module, since the single field-effect transistor 112 is used instead of conventional dual field-effect transistors, resistance may be reduced to increase an overall operation speed and a reduction in volume may be additionally expected.

The above-described protection circuit unit may be implemented as a semiconductor chip and thus may be produced to a micrometer or nanometer size by using silicon process technology. For example, both of the P-IC 118 and the single field-effect transistor 112 may be produced as semiconductor chips and the passive elements, e.g., the resistors R1 and R2 and the capacitors C1 and C2, may also be produced in the form of chips. Such a chip structure may be easily mounted on a substrate by using surface mount technology (SMT).

Figure 2:
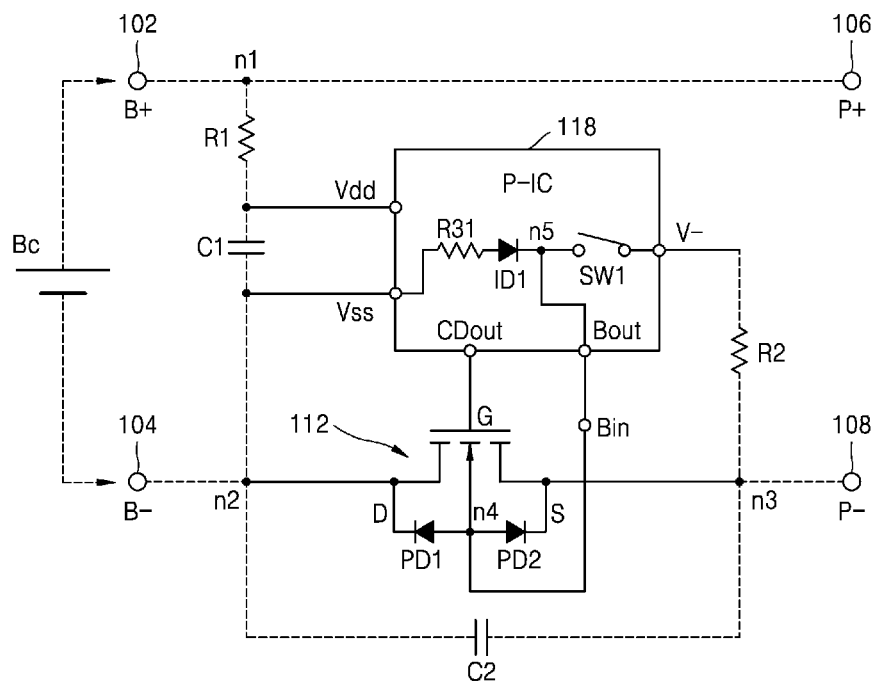
FIG. 2 is a circuit diagram showing another example of the part of the battery protection circuit module according to embodiments of the present invention.
Figure 3:
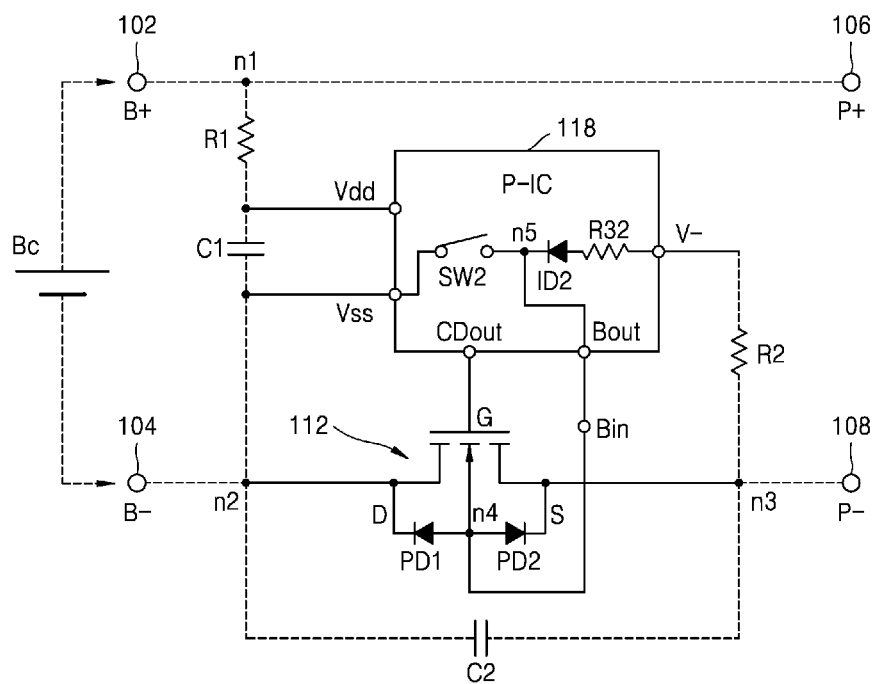
FIG. 3 is a circuit diagram showing another example of the part of the battery protection circuit module according to embodiments of the present invention.

FIGS. 2 and 3 are circuit diagrams showing other examples of the part of the battery protection circuit module according to embodiments of the present invention. The battery protection circuit modules according to the current embodiments show detailed internal configurations of the P-IC 118 of the battery protection circuit module of FIG. 1, and thus repeated descriptions between the embodiments will be omitted herein.

Referring to FIGS. 2 and 3, the P-IC 118 may control charging/discharging of the battery bare cell Bc by controlling the gate terminal G to control whether to switch on the single field-effect transistor 112 and controlling a bias voltage of the well terminal Bin by using an internal switch SW1 or SW2.

In the P-IC 118, the bias terminal Bout may be always connected to one of the reference terminal Vss and the detection terminal V−, and the internal switch SW1 or SW2 may be connected between the bias terminal Bout and the other of the reference terminal Vss and the detection terminal V−, which is not always connected to the bias terminal Bout. Furthermore, the P-IC 118 may include a diode ID1 or ID2 connected between the bias terminal Bout and the one of the reference terminal Vss and the detection terminal V−, which is connected to the bias terminal Bout, to have a forward direction corresponding to a direction toward the bias terminal Bout.

Referring to FIG. 2, the bias terminal Bout may be always connected via the diode ID1 to the reference terminal Vss, and the internal switch SW1 may be interposed between the bias terminal Bout and the detection terminal V−. Specifically, the bias terminal Bout may be connected to a node n5 between the reference terminal Vss and the detection terminal V−, and the diode ID1 and an internal resistor R31 may be interposed between the node n5 and the reference terminal Vss. The internal switch SW1 may be interposed between the node n5 and the detection terminal V−. The diode ID1 may be connected between the node n5 and the reference terminal Vss to have a reverse direction corresponding to a direction from the node n5 toward the reference terminal Vss.

During normal charging, the internal switch SW1 may be turned off, and the single field-effect transistor 112 may be turned on such that a charging current may flow through a channel of the single field-effect transistor 112. When the internal switch SW1 is turned off, the bias terminal Bout may output a voltage of the reference terminal Vss.

However, when overcharge is detected during charging or when charge overcurrent is detected, the internal switch SW1 may be turned on and the single field-effect transistor 112 may be turned off. As described above, when the internal switch SW1 is turned on, the bias terminal Bout may be connected to the detection terminal V− and a voltage of the detection terminal V− may be applied to the well terminal Bin. Thus, when the battery is charged, the parasitic diode PD2 corresponding to a forward direction may be disabled and the parasitic diode PD1 corresponding to a reverse direction may have a certain internal voltage, thereby interrupting a charging current from the drain D toward the source S. As such, the charging current may be interrupted in a whole circuit.

For charging resumption, the single field-effect transistor 112 may be turned on by detecting a set voltage variation of the voltage source terminal Vdd, the detection terminal V−, and/or the reference terminal Vss to detect disconnection of a charger or connection of a load, and the internal switch SW1 may be turned off.

During normal discharging, the internal switch SW1 may be turned off, and the single field-effect transistor 112 may be turned on such that a discharging current may flow through a channel of the single field-effect transistor 112.

However, when overdischarge is detected during discharging or when discharge overcurrent is detected, the internal switch SW1 may be turned off and the single field-effect transistor 112 may also be turned off. When the internal switch SW1 is turned off, the bias terminal Bout may be continuously connected to the reference terminal Vss and a voltage of the reference terminal Vss may be applied to the well terminal Bin. Thus, when the battery is discharged, the parasitic diode PD1 corresponding to a forward direction may be disabled and the parasitic diode PD2 corresponding to a reverse direction may have an internal voltage, thereby interrupting a discharging current from the source S toward the drain D. As such, the discharging current may be interrupted in a whole circuit.

For discharging resumption, the single field-effect transistor 112 may be turned on by detecting a set voltage variation of the voltage source terminal Vdd, the detection terminal V−, and/or the reference terminal Vss to detect connection of a charger or disconnection of a load, and the internal switch SW1 may be continuously turned off.

In the above-described charging/discharging control method, a current between the reference terminal Vss and the bias terminal Bout or between the reference terminal Vss and the detection terminal V− may be reduced to a negligibly small value by increasing the value of the internal resistor R31. For example, the internal resistor R31 may have a value within a range of about 10 kΩ to about 20 kΩ, and thus a current passing through the P-IC 118 between the reference terminal Vss and the detection terminal V− may merely correspond to a level of a leakage current equal to or less then several ten to several hundred μA and thus may be negligibly small. For example, when overcharge, charge overcurrent, overdischarge, or discharge overcurrent is detected, not only a current passing through the single field-effect transistor 112 but also a current passing through the P-IC 118 may be interrupted.

Referring to FIG. 3, the bias terminal Bout may be always connected via the diode ID2 to the detection terminal V−, and the internal switch SW2 may be interposed between the bias terminal Bout and the reference terminal Vss. Specifically, the bias terminal Bout may be connected to the node n5 between the reference terminal Vss and the detection terminal V−, and the diode ID2 and an internal resistor R32 may be further interposed between the node n5 and the detection terminal V−. For example, the internal switch SW2 may be interposed between the node n5 and the reference terminal Vss. The diode ID2 may be connected between the node n5 and the detection terminal V− to have a reverse direction corresponding to a direction from the node n5 toward the detection terminal V−.

During normal charging, both of the internal switch SW2 and the single field-effect transistor 112 may be turned on such that a charging current may flow through a channel of the single field-effect transistor 112. When the internal switch SW2 is turned on, the bias terminal Bout may output a voltage of the reference terminal Vss.

However, when overcharge is detected during charging or when charge overcurrent is detected, the internal switch SW2 may be turned off and the single field-effect transistor 112 may be turned off. When the internal switch SW12 is turned off, the bias terminal Bout may be connected to the detection terminal V− and a voltage of the detection terminal V− may be applied to the well terminal Bin. Thus, when the battery is charged, the parasitic diode PD2 corresponding to a forward direction may be disabled and the parasitic diode PD1 corresponding to a reverse direction may have a certain internal voltage, thereby interrupting a charging current. As such, the charging current may be interrupted in a whole circuit. For charging resumption, both of the single field-effect transistor 112 and the internal switch SW2 may be turned on.

During normal discharging, both of the internal switch SW2 and the single field-effect transistor 112 may be turned on such that a discharging current may flow through a channel of the single field-effect transistor 112.

However, when overdischarge is detected during discharging or when discharge overcurrent is detected, the internal switch SW2 may be turned on and the single field-effect transistor 112 may be turned off. When the internal switch SW2 is turned on, the bias terminal Bout may be continuously connected to the reference terminal Vss and a voltage of the reference terminal Vss may be applied to the well terminal Bin. Thus, when the battery is discharged, the parasitic diode PD1 corresponding to a forward direction may be disabled and the parasitic diode PD2 corresponding to a reverse direction may have an internal voltage, thereby interrupting a discharging current from the source S toward the drain D. As such, the discharging current may be interrupted in a whole circuit.

For discharging resumption, both of the single field-effect transistor 112 and the internal switch SW2 may be turned on by detecting a set voltage variation of the voltage source terminal Vdd, the detection terminal V−, and/or the reference terminal Vss to detect connection of a charger or disconnection of a load.

In the above-described charging/discharging control method, a current between the reference terminal Vss and the bias terminal Bout or between the reference terminal Vss and the detection terminal V− may be reduced to a negligibly small value by increasing the value of the internal resistor R32. For example, the internal resistor R32 may have a value within a range of about 10 kΩ to about 20 kΩ, and thus a current passing through the P-IC 118 between the reference terminal Vss and the detection terminal V− may merely correspond to a leakage current equal to or less then several ten to several hundred μA and thus may be negligibly small. For example, when overcharge, charge overcurrent, overdischarge, or discharge overcurrent is detected, not only a current passing through the single field-effect transistor 112 but also a current passing through the P-IC 118 may be interrupted.

According to the afore-described embodiments, charging/discharging of the battery bare cell Bc may be controlled using the single field-effect transistor 112 by controlling an on-off state of the single field-effect transistor 112 and controlling a bias voltage output through the well terminal Bin, by using the internal switch SW1 or SW2.

Since the bias voltage may be controlled using only one internal switch SW1 or SW2 by always connecting the bias terminal Bout to one of the reference terminal Vss and the detection terminal V−, a switch structure may be simplified. In addition, using the resistor R31 or R32 and the diode ID1 or ID2, a current flowing into the P-IC 118 for charging/discharging control may be significantly reduced to a level of a leakage current and charging/discharging resumption may be enabled by detecting connection of a charger or a load.

Furthermore, in some embodiments, the P-IC 118 may not include a transistor but a conventional inverter circuit may be used to switch a voltage, thereby simplifying a circuit structure.

Figure 4A:
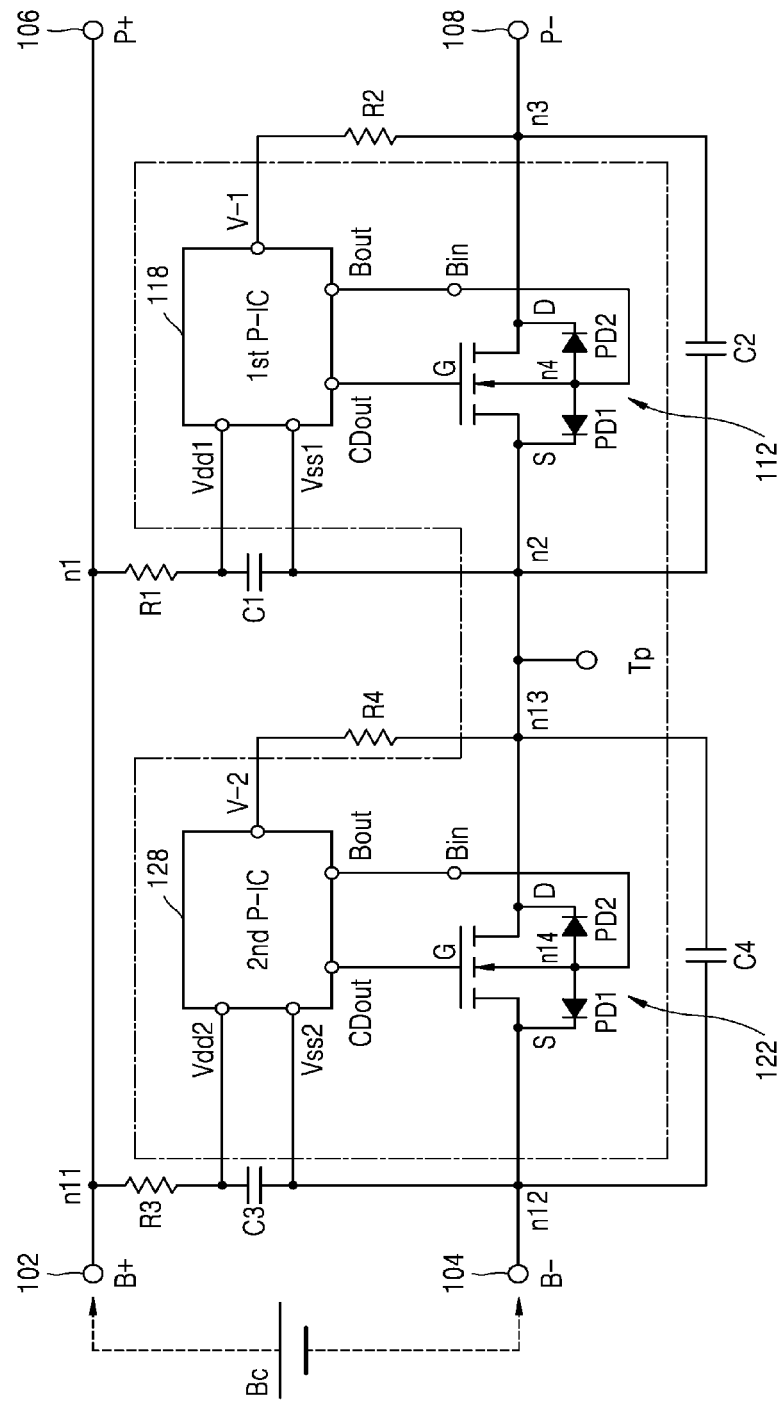
FIGS. 4A to 4C are a circuit diagram, a perspective view, and a plane view of a battery protection circuit module and a module package according to a first embodiment of the present invention.

FIG. 4A is a circuit diagram of a battery protection circuit module according to a first embodiment of the present invention.

Referring to FIG. 4A, the battery protection circuit module according to the first embodiment of the present invention includes a first positive terminal 102 and a first negative terminal 104 electrically connected to electrode terminals of a battery bare cell Bc, a second positive terminal 106 and a second negative terminal 108 electrically connected to a charger or an electronic device, a first protection circuit unit including a first single field-effect transistor 112 connected between at least one of the first positive and negative terminals 102 and 104 and at least one of the second positive and negative terminals 106 and 108, and a first P-IC 118 for controlling the first single field-effect transistor 112, and a second protection circuit unit including a second single field-effect transistor 122 connected between at least one of the first positive and negative terminals 102 and 104 and at least one of the second positive and negative terminals 106 and 108, and a second P-IC 128 for controlling the second single field-effect transistor 122.

Descriptions of the configuration and operation between the second single field-effect transistor 122 and the second P-IC 128 and the configuration and operation between the first single field-effect transistor 112 and the first P-IC 118 may refer to the above descriptions of the configuration and operation of the single field-effect transistor 112 in relation to FIGS. 1 to 3, and thus will be omitted herein.

However, the configurations and operations of the second P-IC 128 and the first P-IC 118, which will be described below in relation to FIGS. 4A to 10A, are not limited to the descriptions provided above in relation to FIGS. 1 to 3, and may be variously modified. For example, in the second P-IC 128 and/or the first P-IC 118, a bias terminal may not be always connected via a diode to a reference terminal or a detection terminal but a bias voltage of a well terminal may be controlled by increasing the number of internal switches. Additionally, in another modified embodiment, an internal switch may not be embedded in a P-IC but may be separately provided and packaged outside.

At least one of the first and second protection circuit units may operate for overcurrent protection to replace a positive temperature coefficient (PTC) thermistor. For example, the second protection circuit unit including the second single field-effect transistor 122 and the second P-IC 128 may operate to interrupt overcurrent flowing through the battery bare cell Bc, and the first protection circuit unit including the first single field-effect transistor 112 and the first P-IC 118 may operate to control overcharge and/or overdischarge of the battery bare cell Bc.

Optionally, although not shown in FIG. 4A, a structure in which a resistor and a varistor are connected in parallel to each other may be added for ESD and surge protection. In the above-described second and first protection circuit units, the number or configuration of passive elements may be appropriately changed in accordance with added functions.

According to the dual protection circuit configuration of the present invention, since the battery bare cell Bc is protected using a dual protection structure of the first and second protection circuit units, a typical overcurrent or overheating protection device, e.g., a PTC thermistor or a bimetal junction structure, may be omitted and thus a total volume thereof may be reduced. The first and second protection circuit units may be implemented as semiconductor chips, and thus may be produced to a micrometer or nanometer size by using silicon process technology.

For example, all of the second P-IC 128, the first P-IC 118, the second single field-effect transistor 122, and the first single field-effect transistor 112 may be produced as semiconductor chips and passive elements, e.g., resistors R1, R2, R3, and R4 and capacitors C1, C2, C3, and C4, may also be produced in the form of chips. Such a chip structure may be easily mounted on a substrate by using surface mount technology (SMT).

Figure 4B:
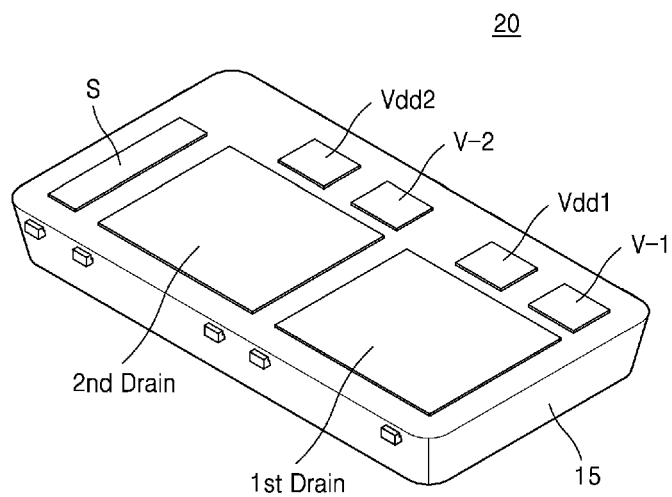
Figure 4C:
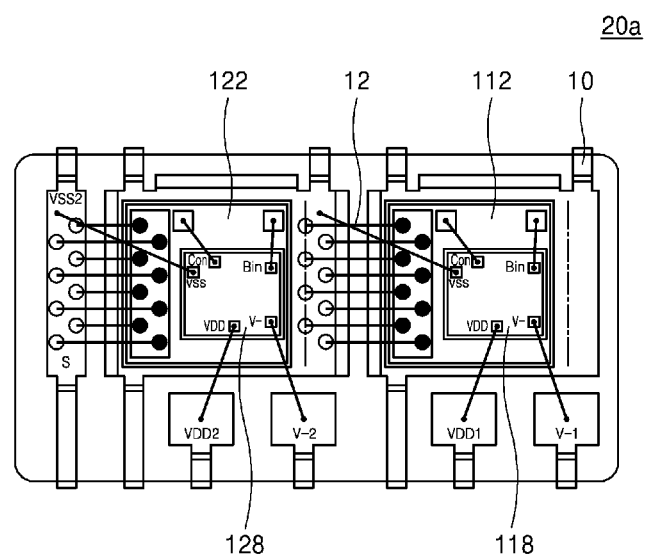

FIG. 4B is a perspective view of a module package 20 in which a part surrounded by a dot-and-dash line in the circuit diagram of FIG. 4A is implemented as one package. The module package 20 illustrated in FIG. 4B includes an encapsulant 15 implemented by molding a structure 20a illustrated in FIG. 4C. The locations and shapes of output terminals of the module package 20 illustrated in FIG. 4B may be changed in accordance with a design. The structure 20*a* illustrated in FIG. 4C is obtained by mounting the part surrounded by a dot-and-dash line in the circuit diagram of FIG. 4A, on a substrate 10 and then connecting the part to the substrate 10 by using an electrical connection member 12, and may show an internal layout of the module package 20 illustrated in FIG. 4B. The substrate 10 may be configured as a lead frame, or may be configured as a printed circuit board (PCB) in a modified embodiment. The electrical connection member 12 may be configured as bonding wire, bonding ribbon, or the like.

Various modified embodiments of the battery protection circuit module will now be described.

Figure 5A:
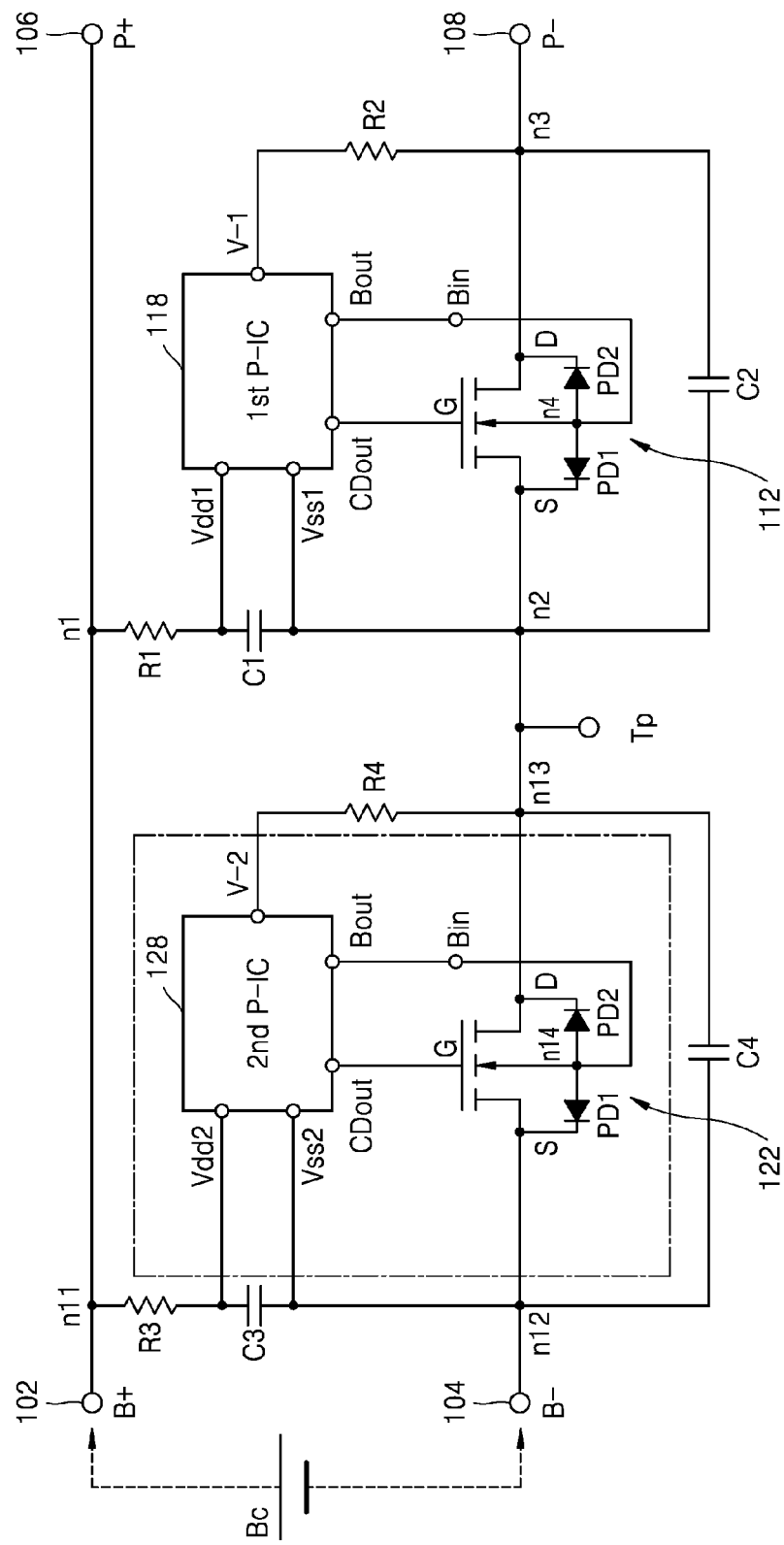
FIGS. 5A to 5C are a circuit diagram, a perspective view, and a plane view of a battery protection circuit module and a module package according to a second embodiment of the present invention.
Figure 5B:
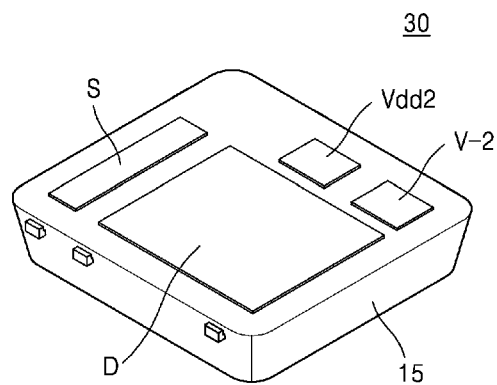
Figure 5C:
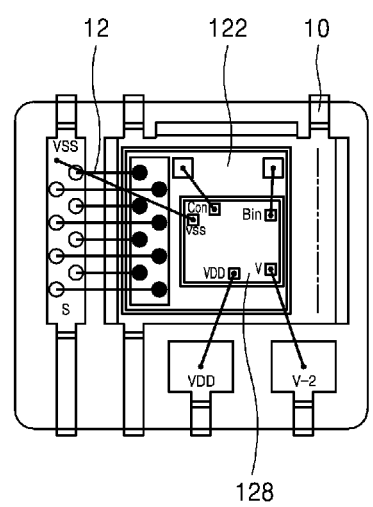

FIG. 5B is a perspective view of a module package 30 in which a part surrounded by a dot-and-dash line in a circuit diagram of FIG. 5A is implemented as one package, and FIG. 5C shows an internal layout of the module package 30 illustrated in FIG. 5B. That is, the module package 30 illustrated in FIG. 5B is obtained by implementing only a second single field-effect transistor 122 and a second P-IC 128 as one package. Alternatively, in the same manner, only a first single field-effect transistor 112 and a first P-IC 118 may be implemented as one package. The locations and shapes of output terminals of the module package 30 illustrated in FIG. 5B may be changed in accordance with a design. Detailed descriptions of the module package 30 are provided above in relation to FIGS. 1 to 3 and 4A to 4C and thus will be omitted herein.

Figure 6A:
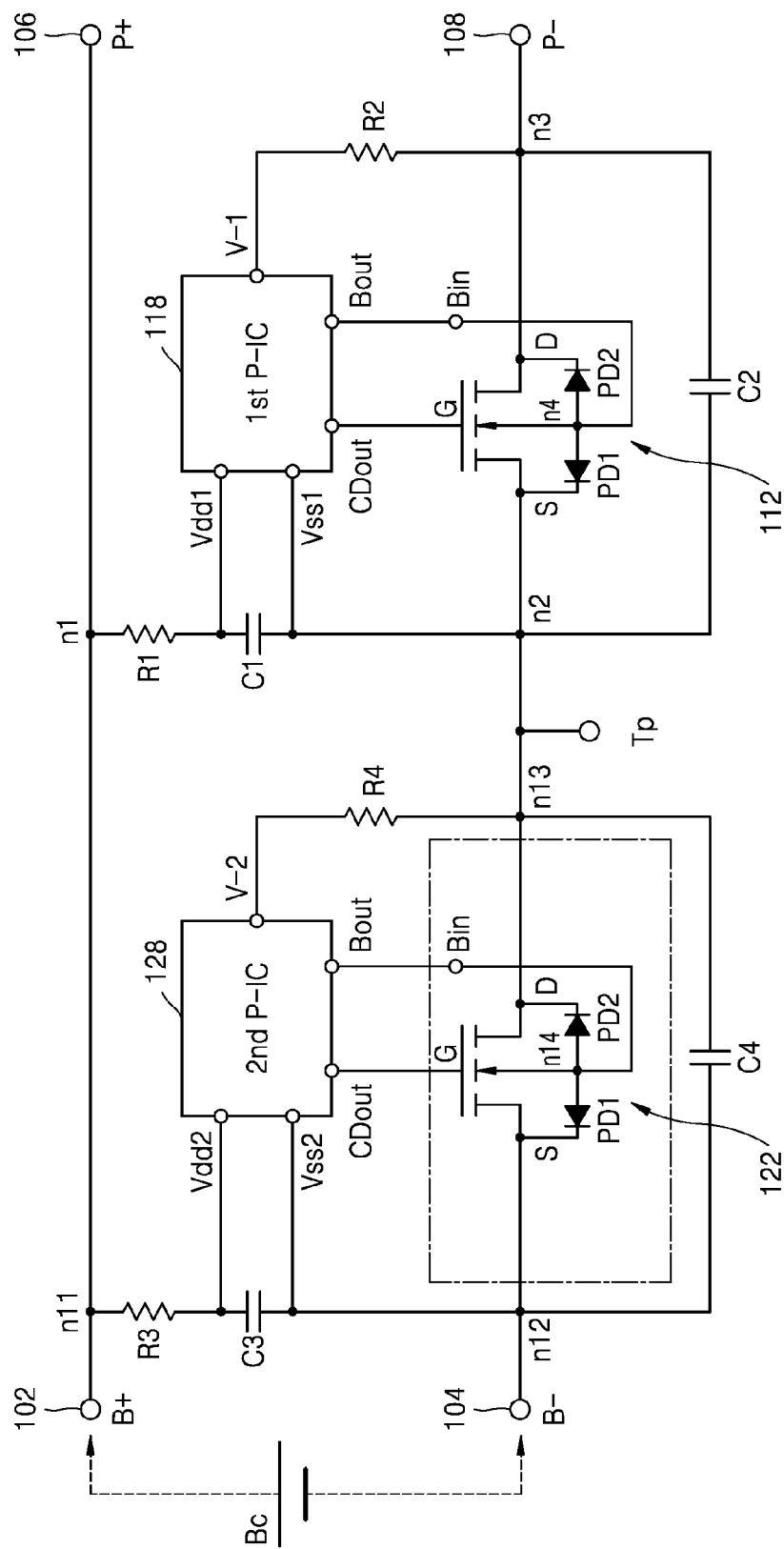
FIGS. 6A to 6C are a circuit diagram, a perspective view, and a plane view of a battery protection circuit module and a module package according to a third embodiment of the present invention.
Figure 6B:
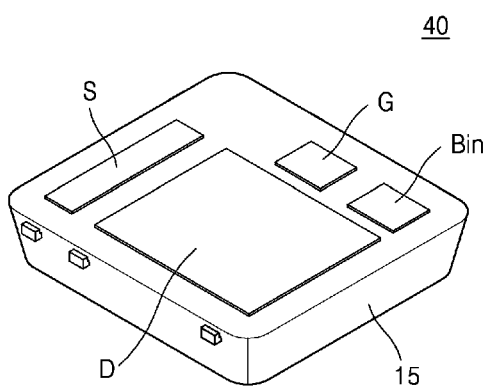
Figure 6C:
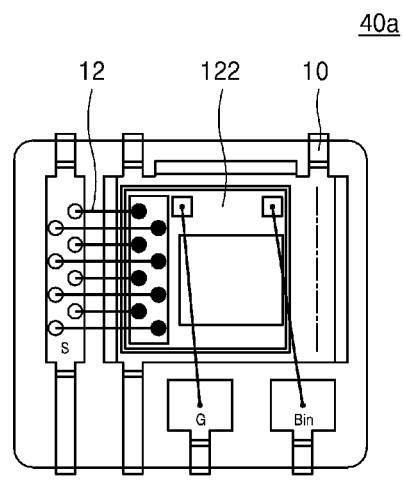

FIG. 6B is a perspective view of a module package 40 in which a part surrounded by a dot-and-dash line in a circuit diagram of FIG. 6A is implemented as one package, and FIG. 6C shows an internal layout of the module package 40 illustrated in FIG. 6B. That is, the module package 40 illustrated in FIG. 6B is obtained by implementing only a second single field-effect transistor 122 as one package. Alternatively, in the same manner, only a first single field-effect transistor 112 may be implemented as one package. The locations and shapes of output terminals of the module package 40 illustrated in FIG. 6B may be changed in accordance with a design. Detailed descriptions of the module package 40 are provided above in relation to FIGS. 1 to 3 and 4A to 4C and thus will be omitted herein.

Figure 7A:
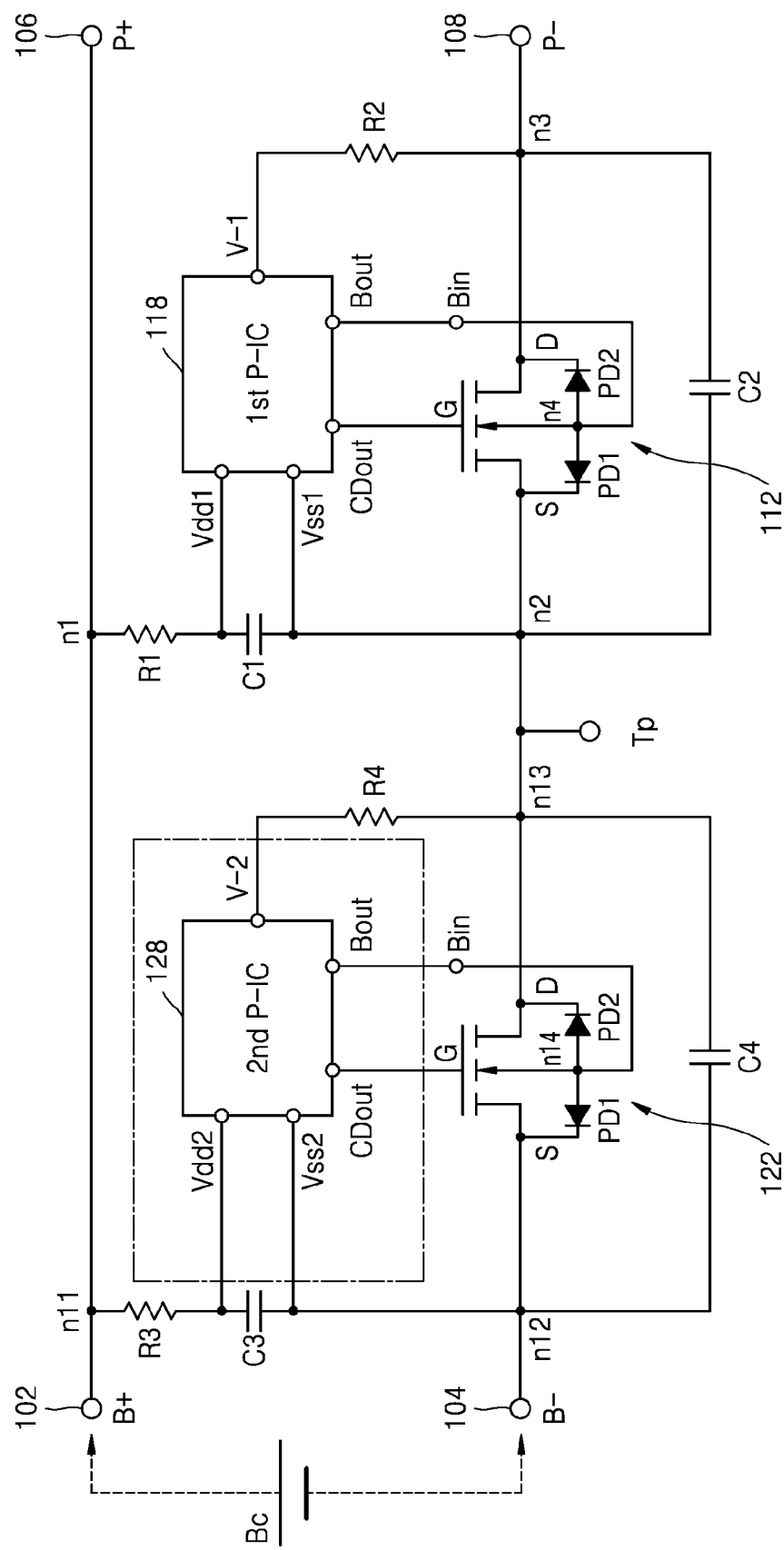
FIGS. 7A to 7C are a circuit diagram, a perspective view, and a plane view of a battery protection circuit module and a module package according to a fourth embodiment of the present invention.
Figure 7B:
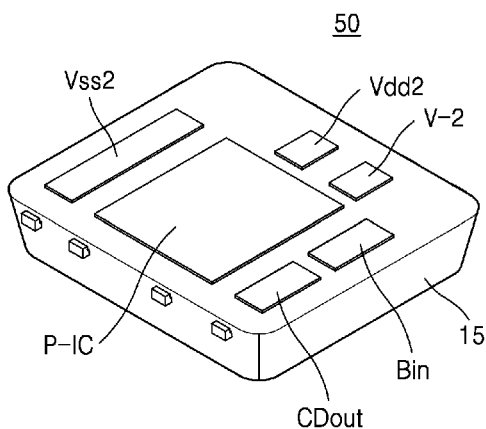
Figure 7C:
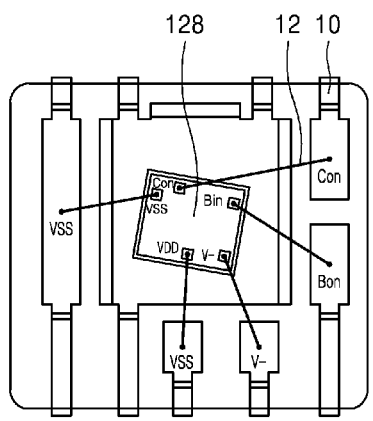

FIG. 7B is a perspective view of a module package 50 in which a part surrounded by a dot-and-dash line in a circuit diagram of FIG. 7A is implemented as one package, and FIG. 7C shows an internal layout of the module package 50 illustrated in FIG. 7B. That is, the module package 50 illustrated in FIG. 7B is obtained by implementing only a second P-IC 128 as one package. Alternatively, in the same manner, only a first P-IC 118 may be implemented as one package. The locations and shapes of output terminals of the module package 50 illustrated in FIG. 7B may be changed in accordance with a design. Detailed descriptions of the module package 50 are provided above in relation to FIGS. 1 to 3 and 4A to 4C and thus will be omitted herein.

Figure 8A:
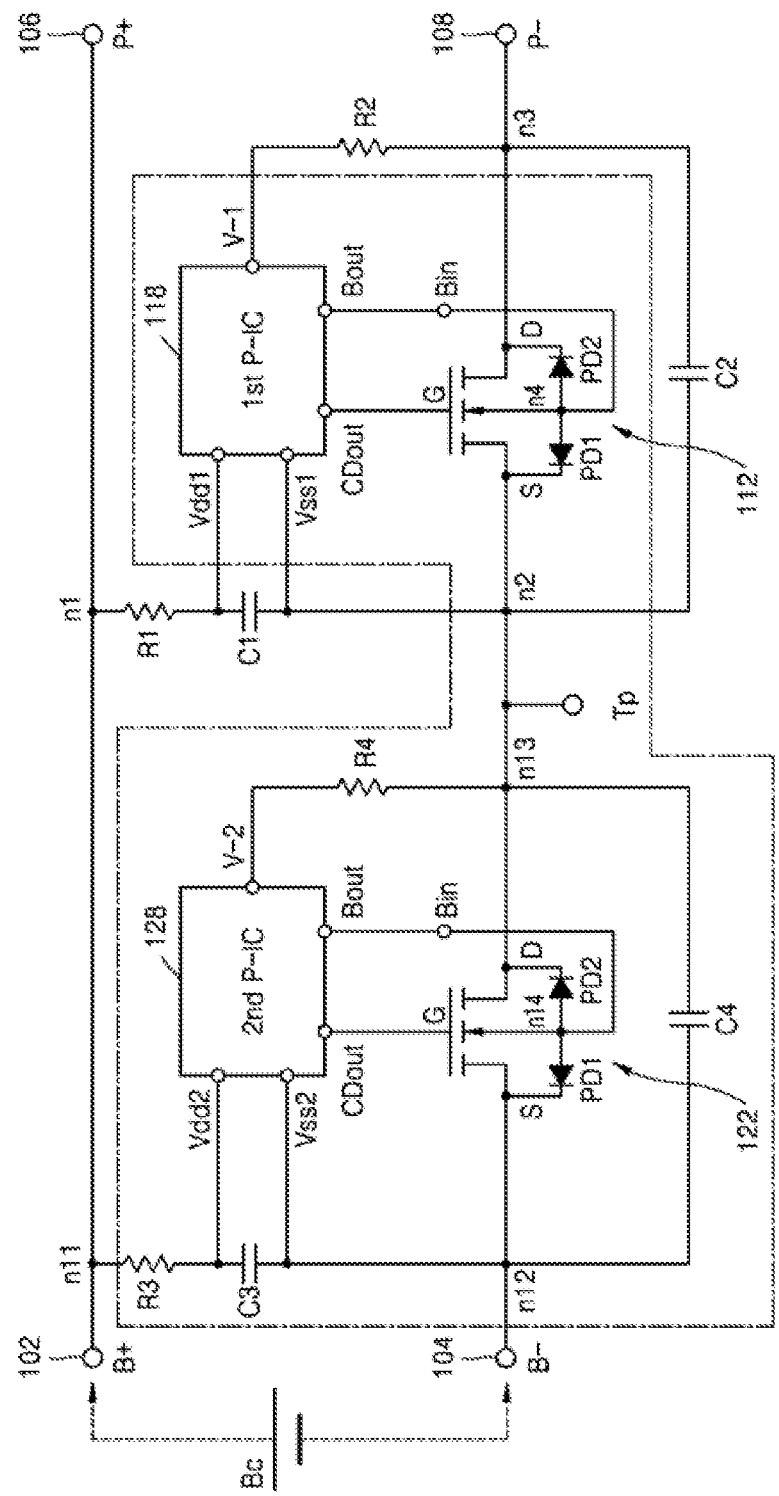
FIGS. 8A to 8C are a circuit diagram, a perspective view, and a plane view of a battery protection circuit module and a module package according to a fifth embodiment of the present invention.
Figure 8B:
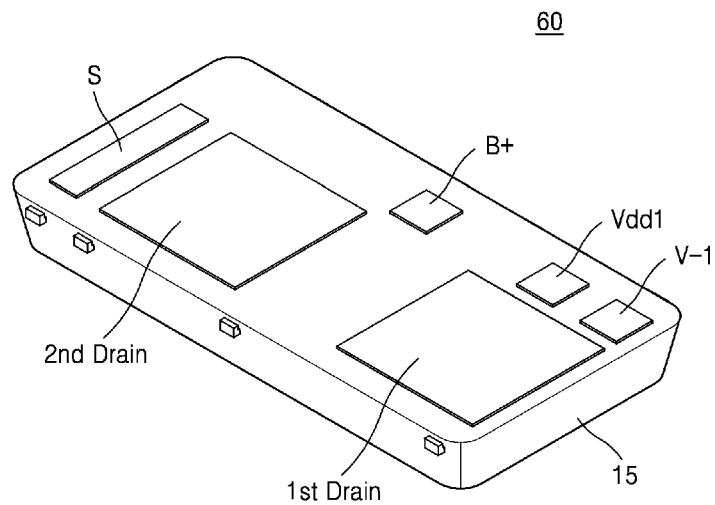
Figure 8C:
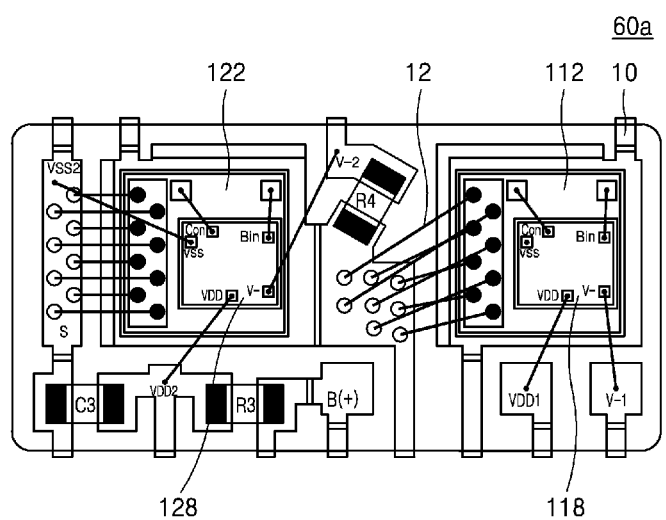

FIG. 8B is a perspective view of a module package 60 in which a part surrounded by a dot-and-dash line in a circuit diagram of FIG. 8A is implemented as one package, and FIG. 8C shows an internal layout of the module package 60 illustrated in FIG. 8B. That is, the module package 60 illustrated in FIG. 8B is obtained by implementing a first protection circuit unit including a first single field-effect transistor 112 and a first P-IC 118, a second protection circuit unit including a second single field-effect transistor 122 and a second P-IC 128, and passive elements R3, R4, C3, and C4 added to the second protection circuit unit, as one package. The number of passive elements embedded in the package is not fixed and, as necessary, the passive element C4 may be excluded. The locations and shapes of output terminals of the module package 60 illustrated in FIG. 8B may be changed in accordance with a design. Terminals V-2 and Vdd2 may be additionally provided to be exposed from the package structure. Detailed descriptions of the module package 60 are provided above in relation to FIGS. 1 to 3 and 4A to 4C and thus will be omitted herein.

Figure 9A:
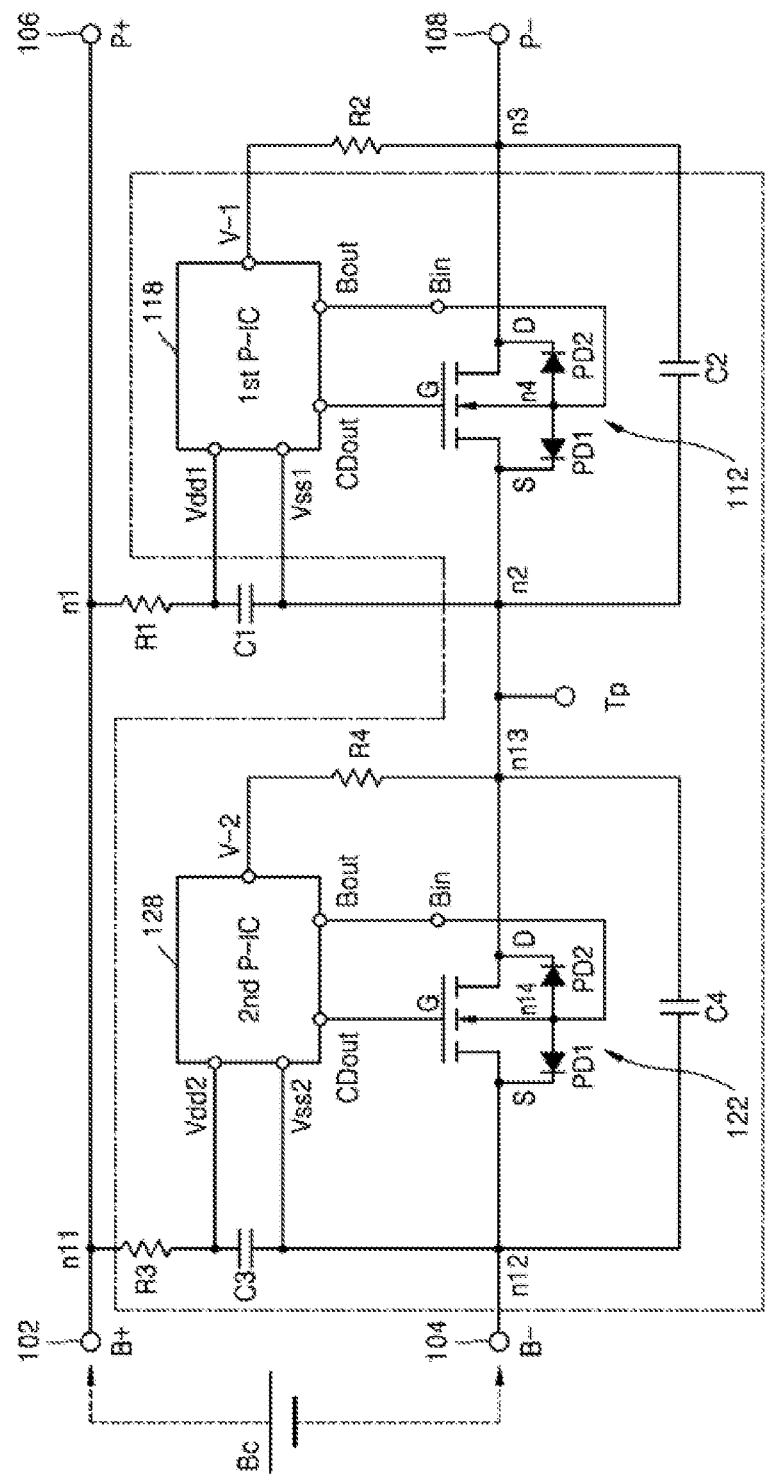
FIGS. 9A to 9C are a circuit diagram, a perspective view, and a plane view of a battery protection circuit module and a module package according to a sixth embodiment of the present invention.
Figure 9B:
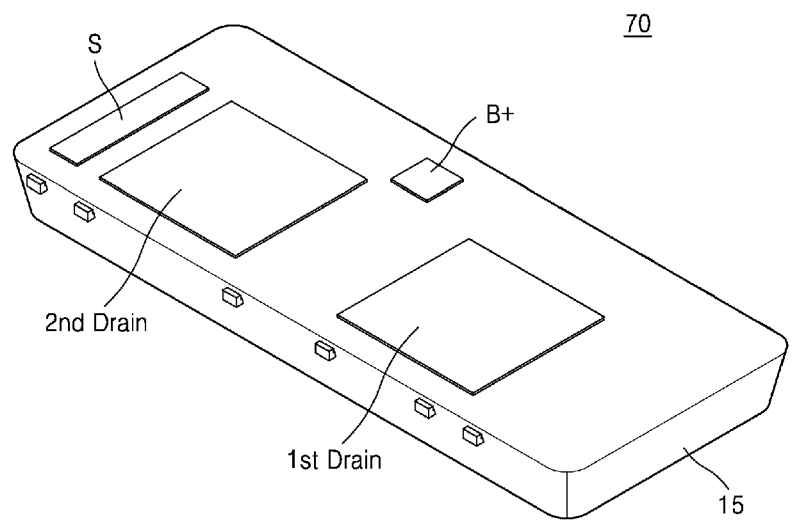
Figure 9C:
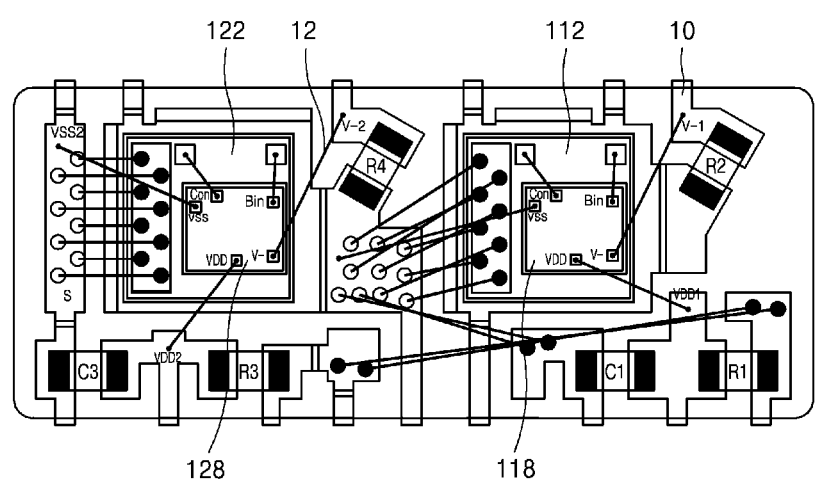

FIG. 9B is a perspective view of a module package 70 in which a part surrounded by a dot-and-dash line in a circuit diagram of FIG. 9A is implemented as one package, and FIG. 9C shows an internal layout of the module package 70 illustrated in FIG. 9B. That is, the module package 70 illustrated in FIG. 9B is obtained by implementing a first protection circuit unit including a first single field-effect transistor 112 and a first P-IC 118, a second protection circuit unit including a second single field-effect transistor 122 and a second P-IC 128, passive elements R3, R4, C3, and C4 added to the second protection circuit unit, and passive elements R1, R2, C1, and C2 added to the first protection circuit unit, as one package. The number of passive elements embedded in the package is not fixed and, as necessary, the passive elements C2 and C4 may be excluded. The locations and shapes of output terminals of the module package 70 illustrated in FIG. 9B may be changed in accordance with a design. Terminals V-2, Vdd2, V-1, and Vdd1 may be additionally provided to be exposed from the package structure. Detailed descriptions of the module package 70 are provided above in relation to FIGS. 1 to 3 and 4A to 4C and thus will be omitted herein.

Figure 10A:
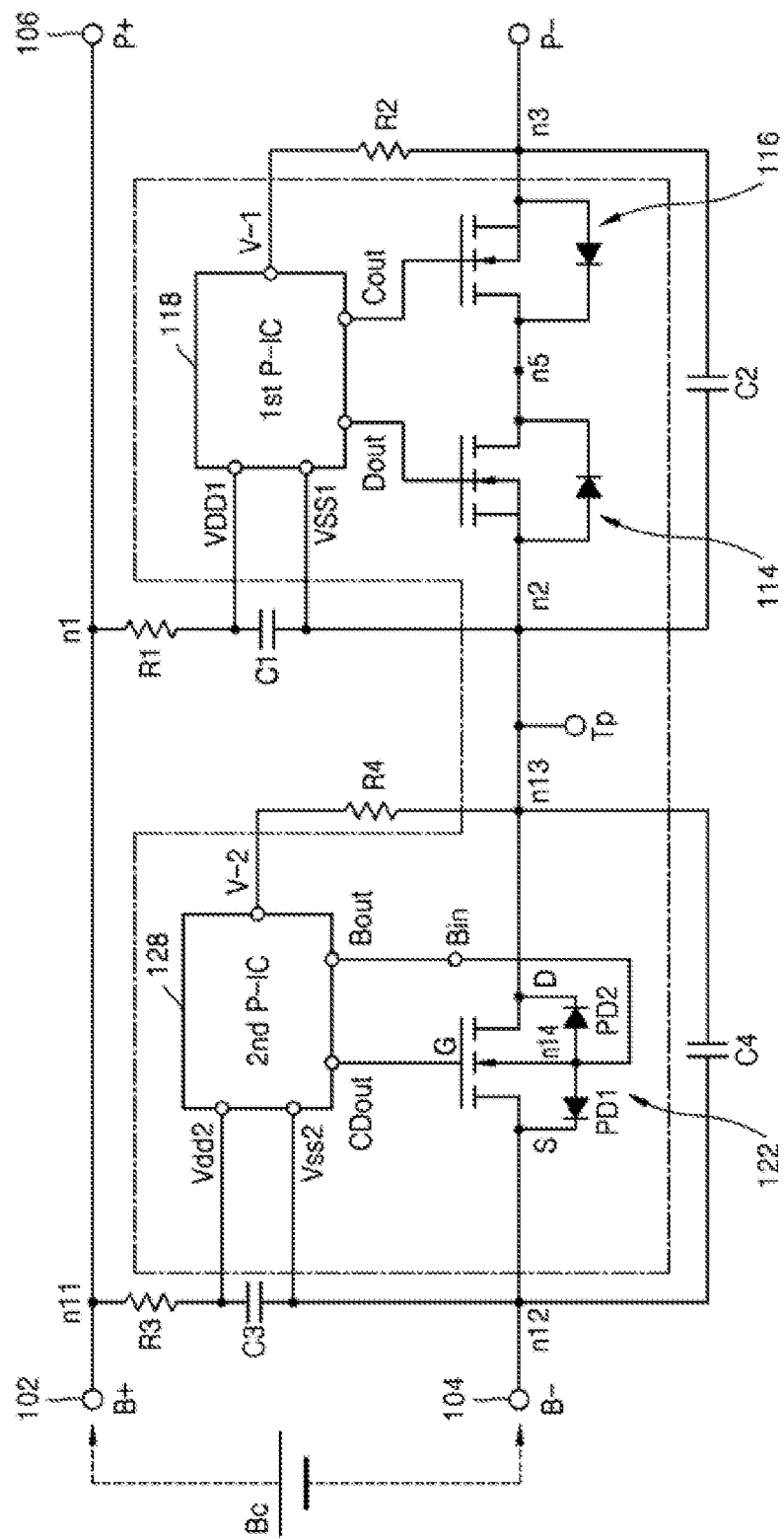
FIGS. 10A to 10C are a circuit diagram, a perspective view, and a plane view of a battery protection circuit module and a module package according to a seventh embodiment of the present invention.

FIG. 10A is a circuit diagram of a battery protection circuit module according to a seventh embodiment of the present invention.

Referring to FIG. 10A, the battery protection circuit module according to the seventh embodiment of the present invention includes a first positive terminal 102 and a first negative terminal 104 electrically connected to electrode terminals of a battery bare cell Bc, a second positive terminal 106 and a second negative terminal 108 electrically connected to a charger or an electronic device, a second protection circuit unit including a second single field-effect transistor 122 connected between at least one of the first positive and negative terminals 102 and 104 and at least one of the second positive and negative terminals 106 and 108, and a second P-IC 128 for controlling the second single field-effect transistor 122, and a first protection circuit unit including a transistor group including two field-effect transistors connected in series to each other between at least one of the first positive and negative terminals 102 and 104 and at least one of the second positive and negative terminals 106 and 108, and a first P-IC 118 for controlling the transistor group.

Descriptions of the configuration between the second single field-effect transistor 122 and the second P-IC 128 may refer to the above descriptions of the configuration and operation of the single field-effect transistor 112 in relation to FIGS. 1 to 3, and thus will be omitted herein.

The transistor group electrically connected to the first P-IC 118 may include a first field-effect transistor 114 and a second field-effect transistor 116 connected in series to each other. For example, the first and second field-effect transistors 114 and 116 may be the same-type MOSFETs, for example, N-type metal-oxide semiconductor field-effect transistors (NMOSFETs), and may be connected in series to each other to share a drain at a node n5. As such, at least one reverse-direction diode may be configured between the drain and a source of each of the first and second field-effect transistors 114 and 116 to control current flow between the first and second negative terminals 104 and 108.

The first P-IC 118 may include a control logic for controlling the transistor group, e.g., the first and second field-effect transistors 114 and 116. For example, the control logic may include a reference voltage setter, a comparer for comparing a reference voltage to a charging/discharging voltage, an overcurrent detector, and a charging/discharging detector. Criteria for determining charging and discharging states may be changed in accordance with specifications required by a user, and the charging and discharging states are determined based on the criteria by detecting a voltage difference between terminals of the first P-IC 118. For example, to output the control logic, the first P-IC 118 may include a reference terminal VSS1, a voltage source terminal VDD1, a detection terminal V-1, a discharging interruption signal output terminal Dout, and a charging interruption signal output terminal Cout.

The first P-IC 118 may be connected via at least one passive element to nodes n1, n2, and n3. For example, the voltage source terminal VDD1 may be connected via a resistor R1 to the node n1, and the reference terminal VSS1 may be connected to the node n2. A capacitor C1 for preventing a short circuit between the two nodes n1 and n2 may be interposed between the reference terminal VSS1 and the voltage source terminal VDD1 between the nodes n1 and n2. The detection terminal V-1 may be connected via a resistor R2 to the node n3.

Based on the above-described configuration, the first P-IC 118 may apply a charging voltage or a discharging voltage through the voltage source terminal VDD1 on the basis of a voltage of the reference terminal VSS1, and detect charging/discharging and overcurrent states through the detection terminal V-1.

The discharging interruption signal output terminal Dout may be connected to a gate of the first field-effect transistor 114 to control an on-off state of the transistor group when the battery is discharged. The charging interruption signal output terminal Cout may be connected to a gate of the second field-effect transistor 116 to control an on-off state of the transistor group when the battery is charged.

When the battery is charged, a charging current flows from the second positive terminal 106 to the first positive terminal 102, and from the first negative terminal 104 to the second negative terminal 108. When the battery is discharged, a discharging current flows from the first positive terminal 102 toward the second positive terminal 106, and from the second negative terminal 108 to the first negative terminal 104.

The first P-IC 118 may operate to turn off the first field-effect transistor 114 by outputting a LOW signal through the discharging interruption signal output terminal Dout when overcurrent or an overdischarge state is detected during battery discharging, or to turn off the second field-effect transistor 116 by outputting a LOW signal through the charging interruption signal output terminal Cout when overcurrent or an overcharge state is detected during battery charging. As such, since at least one of the first and second field-effect transistors 114 and 116 connected in series to each other is turned off, a circuit between the first and second negative terminals 104 and 108 may be interrupted to protect the battery from overcharge, overdischarge, and/or overcurrent.

The resistor R1 and the capacitor C1 serve to stabilize a supply voltage of the first P-IC 118. When the resistor R1 has a high resistance value, since a high voltage is detected due to a current penetrating into the first P-IC 118, a resistance value of the resistor R1 may be set to a value equal to or less than a predetermined value, e.g., 1 KΩ. In addition, for stable operation, a capacitance value of the capacitor C1 may be appropriately adjusted and may have an appropriate value equal to or greater than, for example, 0.01 µF.

The resistors R1 and R2 serve as a current limiter when a charger provides a high voltage exceeding an absolute maximum rating of the first P-IC 118 or when the charger is connected with wrong polarity. Since the resistors R1 and R2 are closely related to power consumption, normally, a sum of resistance values of the resistors R1 and R2 may be set to be greater than 1 KΩ. Since resumption may not occur after overcharge protection if the resistance value of the resistor R2 is excessively high, the resistance value of the resistor R2 may be set to a value equal to or less than 10 KΩ.

The capacitor C1 does not exert a strong influence on characteristics of battery protection circuit products, but is added upon user requests or for stability. The capacitor C1 is used to achieve system stabilization by increasing a tolerance to voltage fluctuations or external noise.

Optionally, although not shown in FIG. 10A, a structure in which a resistor and a varistor are connected in parallel to each other may be added for ESD and surge protection. The varistor is an element capable of reducing a resistance thereof when overvoltage occurs, and may minimize circuit damage or the like due to overvoltage.

Figure 10B:
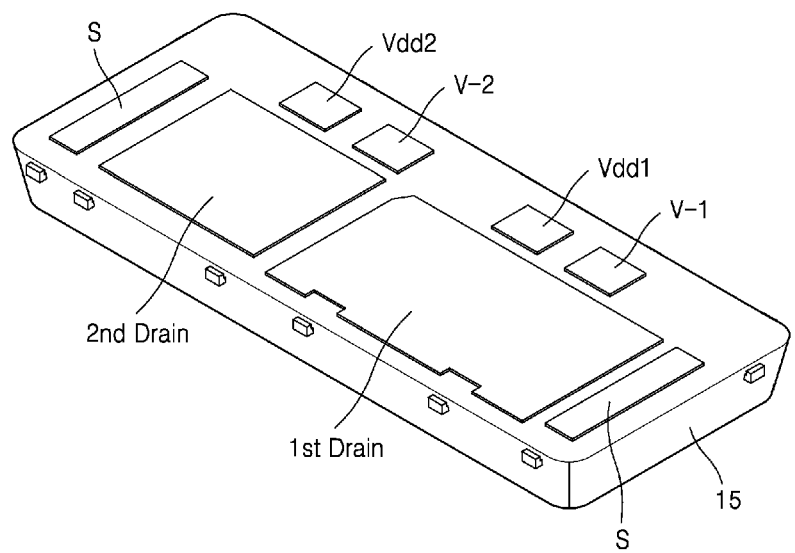

FIG. 10B is a perspective view of a module package 80 in which a part surrounded by a dot-and-dash line in the circuit diagram of FIG. 10A is implemented as one package. The module package 80 illustrated in FIG. 10B includes an encapsulant 15 implemented by molding a structure 80a illustrated in FIG. 10C. The locations and shapes of output terminals of the module package 80 illustrated in FIG. 10B may be changed in accordance with a design. For example, as necessary, terminals V-2, VDD2, V-1, and VDD1 may be additionally provided to be exposed from the package structure.

Figure 10C:
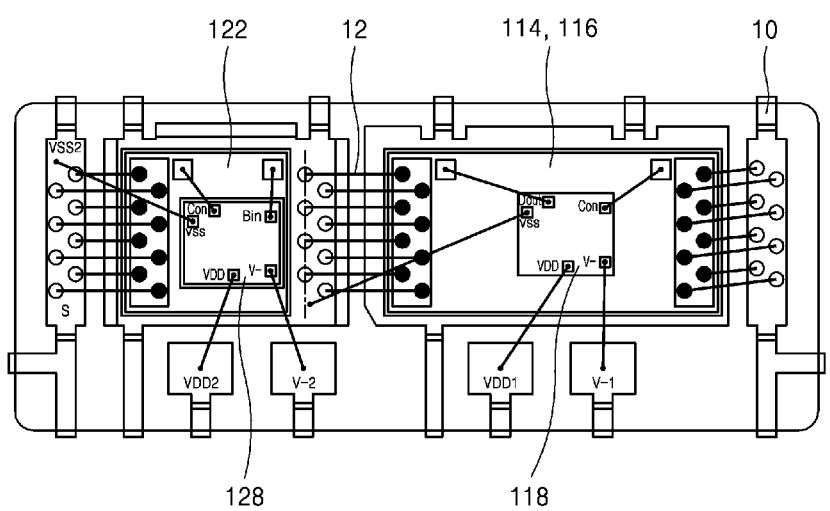

The structure 80a illustrated in FIG. 10C is obtained by mounting the part surrounded by a dot-and-dash line in the circuit diagram of FIG. 10A, on a substrate 10 and then connecting the part to the substrate 10 by using an electrical connection member 12, and may show an internal layout of the module package 80 illustrated in FIG. 10B. The substrate 10 may be configured as a lead frame, or may be configured as a PCB in a modified embodiment. The electrical connection member 12 may be configured as bonding wire, bonding ribbon, or the like.

Figure 11:
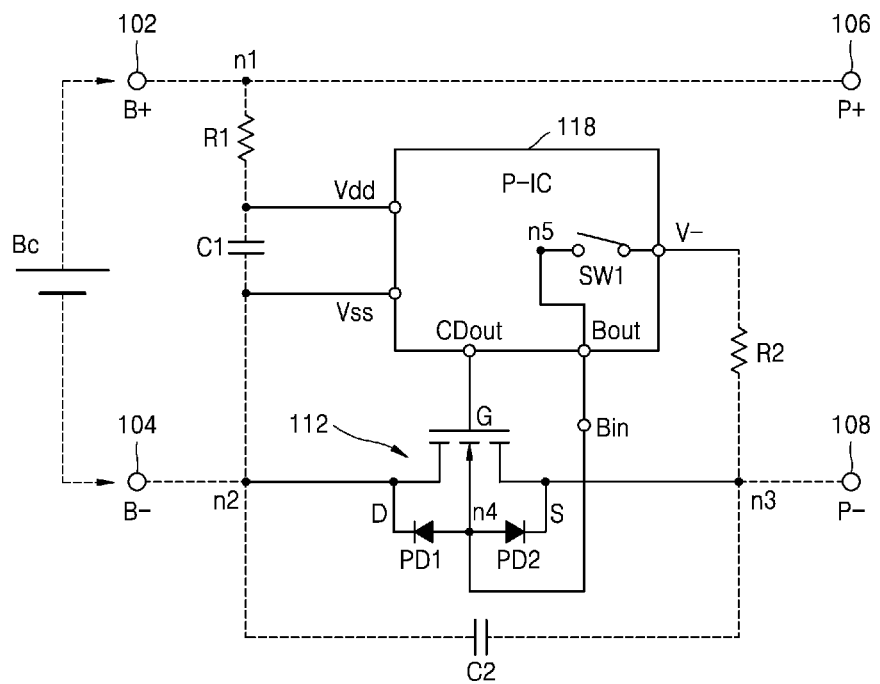
FIG. 11 is a circuit diagram showing a modified example of the part of the battery protection circuit module according to embodiments of the present invention.

In the afore-described embodiments, the configuration of FIG. 2 showing an example of the configuration of the first or second protection circuit unit may be modified as illustrated in FIG. 11.

Referring to FIG. 11, no line may be connected between the reference terminal Vss and the node n5, and the bias terminal Bout may pass through the node n5 and may be connected via the internal switch SW1 to the detection terminal V−. That is, the structure of FIG. 11 may correspond to the structure of FIG. 2, from which the diode ID1 and the resistor R31 are omitted.

During normal charging, the internal switch SW1 may be turned off, and the single field-effect transistor 112 may be turned on such that a charging current may flow through a channel of the single field-effect transistor 112. When the internal switch SW1 is turned off, the bias terminal Bout may be floated.

However, when overcharge is detected during charging or when charge overcurrent is detected, the internal switch SW1 may be turned on and the single field-effect transistor 112 may be turned off. As described above, when the internal switch SW1 is turned on, the bias terminal Bout may be connected to the detection terminal V− and a voltage of the detection terminal V− may be applied to the well terminal Bin. Thus, when the battery is charged, the parasitic diode PD2 corresponding to a forward direction may be disabled and the parasitic diode PD1 corresponding to a reverse direction may have a certain internal voltage, thereby interrupting a charging current. As such, the charging current may be interrupted in a whole circuit.

For charging resumption, the single field-effect transistor 112 may be turned on by detecting a set voltage variation of the voltage source terminal Vdd, the detection terminal V−, and/or the reference terminal Vss to detect disconnection of a charger or connection of a load, and the internal switch SW1 may be turned off.

During normal discharging, the internal switch SW1 may be turned off, and the single field-effect transistor 112 may be turned on such that a discharging current may flow through a channel of the single field-effect transistor 112.

However, when overdischarge is detected during discharging or when discharge overcurrent is detected, the internal switch SW1 may be turned off and the single field-effect transistor 112 may also be turned off. When the internal switch SW1 is turned off, the bias terminal Bout may be floated. In this case, by designing the single field-effect transistor 112 to have an internal voltage, the discharging current through the parasitic diodes PD1 and PD2 may be interrupted without connecting a voltage of the reference terminal Vss to the bias terminal Bout. As such, the discharging current may be interrupted in a whole circuit.

For discharging resumption, the single field-effect transistor 112 may be turned on by detecting a set voltage variation of the voltage source terminal Vdd, the detection terminal V−, and/or the reference terminal Vss to detect connection of a charger or disconnection of a load, and the internal switch SW1 may be continuously turned off.

Figure 12:
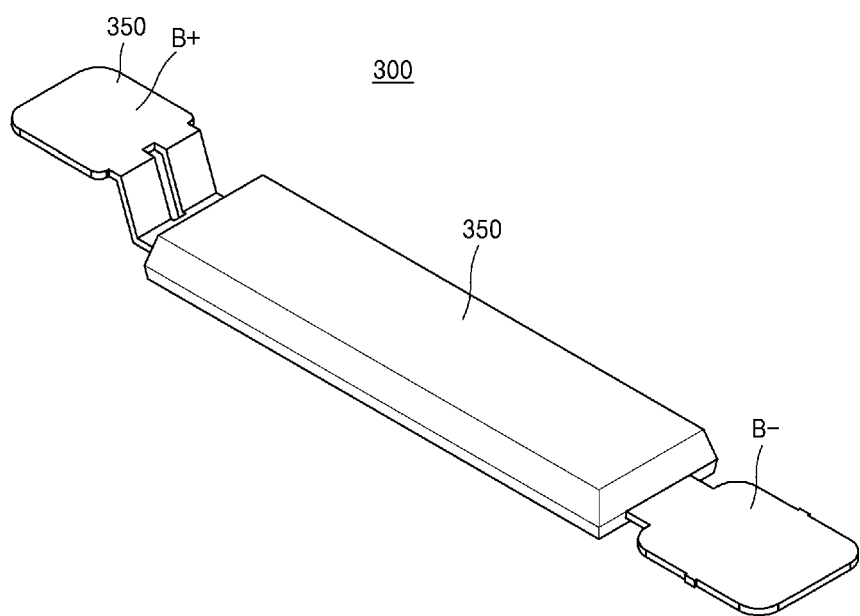
FIG. 12 is a perspective view of a battery protection circuit package according to another embodiment of the present invention.

FIG. 12 is a perspective view of a battery protection circuit package according to another embodiment of the present invention.

Referring to FIG. 12, the battery protection circuit package 300 may be produced by mounting at least one part for configuring the above-described battery protection circuit module, on a substrate 350 and packaging the same. For example, the substrate 350 may include a PCB or a lead frame. The at least one part for configuring the battery protection circuit module, which are mounted on the substrate 350, may include one of the above-described module packages 20, 30, 40, 50, 60, 70, and 80. The at least one part for configuring the battery protection circuit module, which are mounted on the substrate 350, may be encapsulated into one package by using a molding material 330.

In a modified embodiment of the current embodiment, each of the above-described protection circuit units may be mounted on the substrate 350 in the form of a chip scale package (CSP) to reduce a volume thereof.

In another modified embodiment of the current embodiment, the second single field-effect transistor 122, the second P-IC 128, the first single field-effect transistor 112, and the first P-IC 118 may be produced in a stacked package structure or a package on package (POP) structure.

Figure 13:
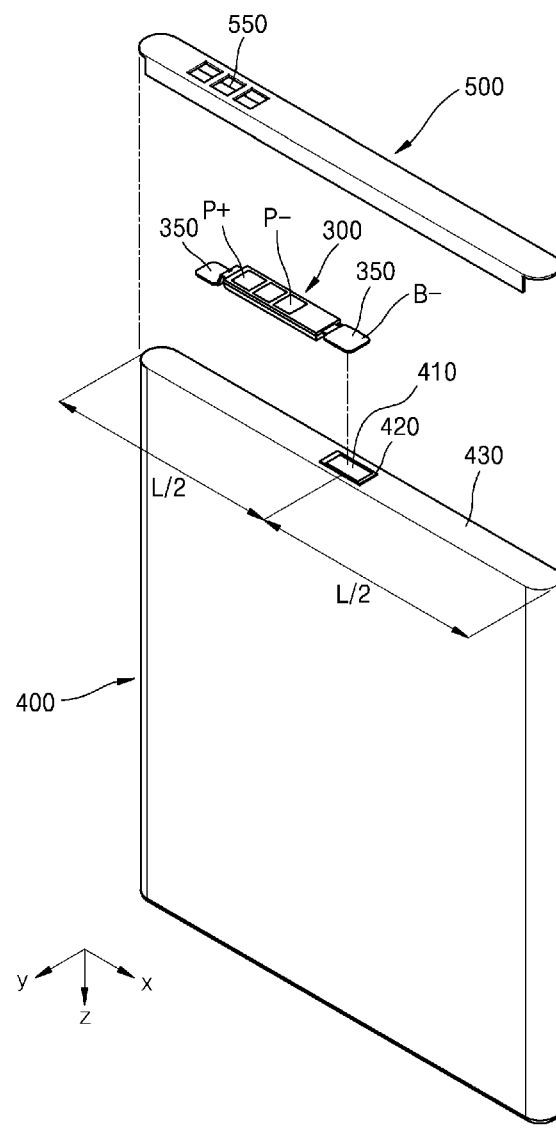
FIG. 13 is a perspective view of a battery pack according to another embodiment of the present invention.

FIG. 13 is a perspective view of a battery pack according to another embodiment of the present invention.

Referring to FIG. 13, the battery pack is configured by inserting the above-described battery protection circuit package 300 between an upper case 500 and a top surface of a battery bare cell embedded in a battery can 400. The upper case 500 is made of plastic and/or metal and has through holes 550 to expose external connection terminals P+ and P− therethrough.

The battery bare cell includes an electrode assembly and a cap assembly. The electrode assembly may include a positive plate produced by coating a positive current collector with a positive active material, a negative plate produced by coating a negative current collector with a negative active material, and a separator interposed between the positive and negative plates to prevent a short circuit between the two electrode plates and to enable movement of lithium ions. A positive tab attached to the positive plate and a negative tab attached to the negative plate protrude from the electrode assembly.

The cap assembly includes a negative terminal 410, a gasket 420, a cap plate 430, etc. The cap plate 430 may serve as a positive terminal. The negative terminal 410 may also be called a negative cell or an electrode cell. The gasket 420 may be made of an insulating material to insulate the negative terminal 410 and the cap plate 430 from each other. Accordingly, electrode terminals of the battery bare cell may include the negative terminal 410 and the cap plate 430.

Specifically, the electrode terminals of the battery bare cell may include a plate 430 having a first polarity (e.g., positive polarity), and an electrode cell 410 having a second polarity (e.g., negative polarity) and located at the center of the plate 430. A first internal connection terminal lead B+ may be bonded and electrically connected to the plate 430 having the first polarity (e.g., positive polarity), and a second internal connection terminal lead B− may be bonded and electrically connected to the electrode cell 410 having the second polarity (e.g., negative polarity). In some embodiments, a length of a lead frame 50 may correspond to a length L/2 from an end of the plate 430 having the first polarity (e.g., positive polarity) to the electrode cell 410 having the second polarity (e.g., negative polarity).

According to some embodiments, since the battery protection circuit package 300 is mounted only at a single side of a top surface of the electrode cell 410 having the second polarity (e.g., negative electrode), a battery size may be reduced or a battery capacitance may be increased. For example, the capacitance of a battery may be increased by further providing another cell on the other side of the electrode cell 410, or the size of a product having the battery may be reduced by providing a chip having another additional function on the other side of the electrode cell 410.

While the present invention has been particularly shown and described with reference to embodiments thereof, it will be understood by one of ordinary skill in the art that various changes in form and details may be made therein without departing from the spirit and scope of the present invention as defined by the following claims.

The invention claimed is:

1. A battery protection circuit module comprising:
 a first positive terminal and a first negative terminal electrically connected to electrode terminals of a battery bare cell;
 a second positive terminal and a second negative terminal electrically connected to a charger or an electronic device;
 a first protection circuit unit comprising a first single field-effect transistor connected between at least one of the first positive and negative terminals and at least one of the second positive and negative terminals, and a first protection integrated circuit for controlling the first single field-effect transistor; and a second protection circuit unit comprising a second single field-effect transistor connected between at least one of the first positive and negative terminals and at least one of the second positive and negative terminals, and a second protection integrated circuit for controlling the second single field-effect transistor, wherein the first protection integrated circuit controls the first single field-effect transistor by detecting overcharge, overdischarge, and/or overcurrent of the battery bare cell, wherein the second protection integrated circuit controls the second single field-effect transistor by detecting overcharge, overdischarge, and/or overcurrent of the battery bare cell, and wherein the first protection circuit unit and the second protection circuit unit provide a dual protection circuit configuration for the battery bare cell.

2. The battery protection circuit module of claim 1, wherein at least one of the second protection circuit unit and the first protection circuit unit operates for overcurrent protection to replace a positive temperature coefficient (PTC) thermistor.

3. The battery protection circuit module of claim 1, wherein the first single field-effect transistor and/or the second single field-effect transistor comprises a drain terminal, a source terminal, a gate terminal, and a well terminal, wherein the first protection circuit unit and the second protection circuit unit controls charging/discharging of the battery bare cell by controlling the gate terminal electrically connected to the first protection integrated circuit and the second protection integrated circuit respectively controlling whether to switch on the first single field-effect transistor and the second single field-effect transistor, and controlling a bias voltage of the well terminal by using an internal switch, wherein the first protection integrated circuit and the second protection integrated circuit comprise a reference terminal, a detection terminal, and a bias terminal connected to the well terminal, respectively, wherein the bias terminal is always connected to one of the reference terminal and the detection terminal, and wherein the internal switch is connected between the bias terminal and the other of the reference terminal and the detection terminal, which is not always connected to the bias terminal.

4. The battery protection circuit module of claim 3, wherein the first protection integrated circuit and the second protection integrated circuit comprise a diode connected between the bias terminal and the one of the reference terminal and the detection terminal, which is connected to the bias terminal, to have a forward direction corresponding to a direction toward the bias terminal respectively.

5. The battery protection circuit module of claim 4, wherein the bias terminal is always connected via the diode to the reference terminal, and wherein the internal switch is interposed between the bias terminal and the detection terminal.

6. The battery protection circuit module of claim 5, wherein the internal switch is turned on when overcharge is detected.

7. The battery protection circuit module of claim 4, wherein the bias terminal is always connected via the diode to the detection terminal, and wherein the internal switch is interposed between the bias terminal and the reference terminal.

8. The battery protection circuit module of claim 7, wherein the internal switch is turned off when overdischarge is detected.

9. The battery protection circuit module of claim 1, wherein the first protection circuit unit and/or the second protection circuit unit further comprises at least one passive element connected to the first protection integrated circuit and the second protection integrated circuit, respectively.

10. The battery protection circuit module of claim 1, wherein the first protection circuit unit and second protection circuit units have equal configurations of elements.

11. The battery protection circuit module of claim 1, wherein the first single field-effect transistor and/or the second single field-effect transistor comprises a drain terminal, a source terminal, a gate terminal, and a well terminal, wherein the first protection integrated circuit and the second protection integrated circuit P-IC controls charging/discharging of the battery bare cell by controlling the gate terminal electrically connected to the first protection circuit unit and the second protection circuit unit, controlling whether to switch on the single field-effect transistor, and controlling a bias voltage of the well terminal by using an internal switch, wherein the first protection integrated circuit and the second protection integrated circuit comprises a reference terminal connected between the first negative terminal and the drain terminal, a detection terminal connected between the second negative terminal and the source terminal, and a bias terminal connected to the well terminal, and wherein the bias terminal is connectable via the internal switch to the detection terminal.

12. The battery protection circuit module of claim 11, wherein the bias terminal is connected to the detection terminal when the internal switch is turned on, and is floated when the internal switch is turned off.

13. A battery protection circuit package comprising:
a substrate; and
the battery protection circuit module of claim 1 mounted on the substrate.

14. A battery pack comprising:
a battery bare cell; and
the battery protection circuit package of claim 13 connected to the battery bare cell.

15. A battery protection circuit module comprising:
a first positive terminal and a first negative terminal electrically connected to electrode terminals of a battery bare cell;
a second positive terminal and a second negative terminal electrically connected to a charger or an electronic device;
a first protection circuit unit comprising a transistor group comprising two field-effect transistors connected in series to each other between at least one of the first positive and negative terminals and at least one of the second positive and negative terminals, and a first protection integrated circuit for controlling the transistor group; and
a second protection circuit unit comprising a second single field-effect transistor connected between at least one of the first positive and negative terminals and at least one of the second positive and negative terminals, and a second protection integrated circuit for controlling the second single field-effect transistor, wherein the first protection integrated circuit controls the two field-effect transistors by detecting overcharge, overdischarge, and/or overcurrent of the battery bare cell, wherein the second protection integrated circuit controls the second single field-effect transistor by detecting overcharge, overdischarge, and/or overcurrent of the battery bare cell, and wherein the first protection circuit unit and the second protection circuit unit provide a dual protection circuit configuration for the battery bare cell.

\* \* \* \* \*